United States Patent
Fraser et al.

(10) Patent No.: US 9,128,841 B2
(45) Date of Patent: Sep. 8, 2015

(54) REMOTE SHUTDOWN VIA FIBER

(71) Applicant: Thales Canada Inc, Toronto, Ontario (CA)

(72) Inventors: Cameron Fraser, Vaughan (CA); Abe Kanner, Mississauga (CA); Serge Kniazev, Aurora (CA)

(73) Assignee: Thales Canada Inc., Toronto, Ontario (CA)

( * ) Notice: Subject to any disclaimer, the term of this patent is extended or adjusted under 35 U.S.C. 154(b) by 165 days.

(21) Appl. No.: 14/077,761

(22) Filed: Nov. 12, 2013

(65) Prior Publication Data

US 2015/0135011 A1    May 14, 2015

(51) Int. Cl.
     *G06F 11/00*    (2006.01)
     *G06F 11/07*    (2006.01)
     *G06F 11/30*    (2006.01)

(52) U.S. Cl.
     CPC ........ *G06F 11/0793* (2013.01); *G06F 11/0745* (2013.01); *G06F 11/3055* (2013.01)

(58) Field of Classification Search
     CPC ............ G06F 11/0793; G06F 11/0745; G06F 11/0709; G06F 11/3006; G06F 11/3055; G06F 11/0772
     USPC .......................... 714/4.1, 24, 22, 30, 41, 47.1
     See application file for complete search history.

(56) References Cited

U.S. PATENT DOCUMENTS

| 6,647,301 B1 | 11/2003 | Sederlund et al. |
|---|---|---|
| 6,715,098 B2 * | 3/2004 | Chen et al. ........... 714/3 |
| 6,789,000 B1 | 9/2004 | Munson |
| 7,813,820 B2 | 10/2010 | Opem et al. |
| 7,869,889 B2 | 1/2011 | Flanders et al. |
| 8,180,466 B2 | 5/2012 | Longsdorf et al. |
| 8,186,948 B2 | 5/2012 | Kabatzke et al. |
| 8,228,946 B2 | 7/2012 | Hao et al. |

(Continued)

FOREIGN PATENT DOCUMENTS

| EP | 1114423 | 2/2007 |
|---|---|---|
| EP | 2550926 | 1/2013 |
| WO | 0017888 | 3/2000 |

OTHER PUBLICATIONS

Armstrong, "Including Electromagnetic Interference (EMI) in Functional Safety Risk Assessments," 2012, <http://mfile.narotama.ac.id/files/ebooks/Achieving%20Systems%20Safety/Chapter%209%20Including%20Electromagnetic%20Interference%20(EMI)%20in%20Functional%20Safety%20Risk%20 Assessments.pdf>.

(Continued)

*Primary Examiner* — Joseph D Manoskey
(74) *Attorney, Agent, or Firm* — Lowe Hauptman & Ham, LLP

(57) ABSTRACT

A system and method provide vital shutdown of a remote slave unit linked by a fiber optic connection to a local, checked redundant master unit with two paired computers. Each computer sends a life signal to an associated local vital supervision card (VSC) and copper to fiber converter (C/F converter) for transmission via fiber to a corresponding fiber to copper converter (F/C converter) on the slave unit, then to a corresponding remote VSC. Each local VSC controls power to a corresponding second local VSC-associated C/F converter, and each remote VSC controls power to a corresponding second remote VSC F/C converter. A VSC detecting an incorrect life signal signature removes power to the corresponding controlled converter and, optionally, to a respective local or remote I/O rack, thereby shutting down the slave unit.

20 Claims, 5 Drawing Sheets

(56) References Cited

U.S. PATENT DOCUMENTS

| | | |
|---|---|---|
| 2004/0153697 A1* | 8/2004 | Chang et al. ............... 714/4 |
| 2004/0153749 A1* | 8/2004 | Schwarm et al. ........... 714/11 |
| 2007/0220301 A1* | 9/2007 | Brundridge et al. ......... 714/4 |
| 2007/0237464 A1* | 10/2007 | Aronson et al. ............ 385/89 |
| 2007/0288674 A1 | 12/2007 | Ikeno |
| 2009/0142061 A1 | 6/2009 | Buabbud et al. |
| 2013/0024024 A1 | 1/2013 | Namiki |

OTHER PUBLICATIONS

International Search Report for corresponding International PCT Application No. PCT/IB2014/063440, dated Sep. 11, 2014.

\* cited by examiner

300

302 — On master unit, send first life signal from first computing device to first VSC and first C/F converter and second life signal from second computing device second VSC and second C/F converter 304 — On fiber coupled between master unit and slave unit, forward first life signal from first C/F converter on master unit to first F/C converter on slave unit, and second life signal from second C/F converter on master unit to second F/C converter on slave unit 306 — On slave unit, forward first life signal from fist F/C converter to third VSC, and second life signal from second F/C converter to fourth VSC 308 — Power down first C/F converter in response to second VSC failing to verify second life signal 310 — Power down second C/F converter in response to first VSC failing to verify first life signal 312 — Power down first F/C converter in response to fourth VSC failing to verify second life signal 314 — Power down second F/C converter in response to third VSC failing to verify first life signal 316 — Power down first I/O rack in response to first VSC or second VSC failing to verify respective life signal 318 — Power down second I/O rack in response to third VSC or fourth VSC failing to verify respective life signal 320 — Power down first C/F converter in response to control signal from first computing device 322 — Power down second C/F converter in response to control signal from second computing device

FIG. 3

REMOTE SHUTDOWN VIA FIBER

BACKGROUND

In multilayer, vital control systems, including safety critical control systems, each layer of a control system needs to be able to safely shut down itself and the layers controlled by (below) that layer. Thus, when a control layer device is a master unit to a slave unit and detects a fault in the slave unit, the master unit needs to be able to shut down the slave unit in a vital manner. Often, the slave unit in such a system is remotely located relative to the master unit.

In a soft shutdown, a master unit sends a shutdown command over a communication channel to a slave unit or ceases communication over the communication channel, and in response the slave unit shuts down. This approach relies on software so a failure in software execution can result in an inability to send a shutdown command or cease communication. This design relies on a probabilistic approach to the assessment of all software failure modes being adequately addressed.

In a hard shutdown, a master unit cuts off power to its outputs and relies on a direct galvanic connection between the master unit and the slave unit via a copper cable. This approach is feasible only over relatively short distances and can be vulnerable to electromagnetic interference and other environmental factors such as lightning, especially with remote configurations.

Other options include configuring a slave unit as a vital unit itself, but this approach significantly increases system expense and complexity.

BRIEF DESCRIPTION OF THE DRAWINGS

One or more embodiments are illustrated by way of example, and not by limitation, in the figures of the accompanying drawings, wherein elements having the same reference numeral designations represent like elements throughout and wherein:

FIG. 3 is a flow chart for a method of remotely shutting down a slave unit, in some embodiments;

DETAILED DESCRIPTION

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

The present description concerns a system and uses thereof. Although subject to other uses, the device is suitable to a multilayer vital or safety critical control system in which each layer of the control system is able to safely shut down itself and the layers controlled by (below) that layer. Remote vital shutdown of a slave unit is achieved without a galvanic connection between the master and slave units, so power can be generated and controlled locally, and increased distances between master and slave units are enabled.

Figure 1:
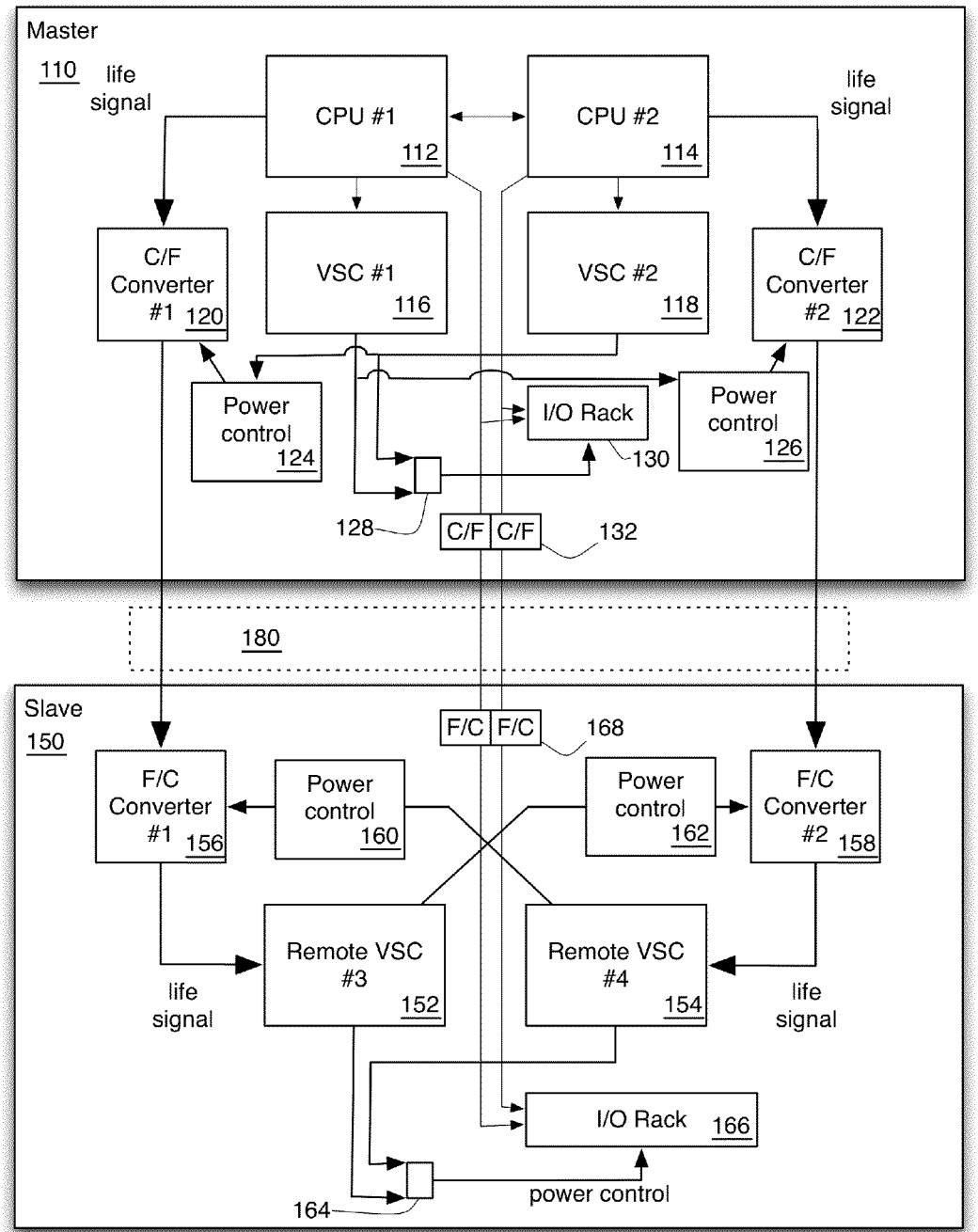
FIG. 1 is a schematic drawing illustrating a system for remote vital shutdown of a slave unit, in some embodiments, showing a master unit linked by an optic fiber connection to a slave unit.

Referring to FIG. 1, a system 100 for remote vital shutdown of a slave unit includes a master unit 110, a slave unit 150, and a fiber connection 180 (indicated using a broken line). In at least some embodiments, fiber connection 180 comprises one or more fiber optic cable connections. Master unit 110 comprises at least one computing device for control of system components including slave unit 150. In at least some embodiments, slave unit 150 is physically remote to, in proximity to, or physically attached or combined with master unit 110. In at least some embodiments, fiber connection 180 is external to master unit 110 and slave unit 150 or internal to a single structure containing master unit 110 and slave unit 150. In some embodiments, fiber connection 180 has a length ranging from less than one meter to more than 10 kilometers.

In the embodiment depicted in FIG. 1, master unit 110 has a checked redundant configuration having a first computing device 112 and a second computing device 114. First computing device 112 and second computing device 114 each include one or more processing units and are identical in configuration. In some embodiments, first computing device 112 and second computing device 114 have differing configurations. Computing devices are well known in the art and are not described in further detail in the present disclosure.

Master unit 110 also includes a first vital supervision card (VSC) 116, a second vital supervision card 118, a first copper to fiber (C/F) converter 120, a second C/F converter 122, a first power control 124, and a second power control 126. In some embodiments, master unit 110 includes a third power control 128 and a first I/O rack 130. In at least some embodiments, first and second power control 124, 126 are omitted from master unit 110.

In at least some embodiments, a VSC is implemented by running a background process on every vital machine having safety integrity level 4 (SIL 4) in the system which listens to communication traffic and collects key data as identified by a configuration profile of the VSC. In some embodiments, SIL 4 is based on International Electrotechnical Commission's (IEC) standard IEC 61508, in at least one embodiment. SIL level 4 means the probability of failure per hour ranges from $10^{-8}$ to $10^{-9}$.

Slave unit 150 includes a third VSC 152, a fourth VSC 154, a first fiber to copper (F/C) converter 156, a second F/C converter 158, a fourth power control 160, and a fifth power control 162. In some embodiments, slave unit 150 includes a sixth power control 164 and a second I/O rack 166. In at least some embodiments, fourth and fifth power control 160, 162 are omitted from slave unit 150.

Fiber 180 includes at least one fiber or fiber cable capable of carrying one or more optical signals. Fiber cables are well known in the art and are not described in further detail in the present disclosure.

First VSC 116, second VSC 118, third VSC 152, and fourth VSC 154 are each a device that includes an input configured to receive one or more electronic signals, a logic component configured to analyze the one or more signals, and an output configured to send one or more control signals. The logic component can be any combination of hardware or hardware and software. The input and output can be any interfaces capable of receiving and sending, respectively, one or more electronic signals. In some embodiments, a VSC is VSC 500 depicted in FIG. 5 and the logic component is hardware controller 510. In some embodiments, a VSC is VSC 500 depicted in FIG. 5 and the logic component is hardware controller 510 and computer program code 542 encoded in computer readable storage medium 540.

In use, each VSC monitors at least one input signal to verify the presence of one or more expected signals. In response to verifying the presence of the one or more expected input signals, the logic component causes the one or more control signals to be output in a state corresponding to a power up indication. In response to a failure to verify the presence of the one or more expected input signals, the logic component causes the one or more control signals to be output in a state corresponding to a power down indication.

First C/F converter 120 and second C/F converter 122 are each a device that includes an input configured to receive one or more electronic signals, a converting component configured to convert the one or more electronic signals to one or more optical signals, and an output configured to send the one or more optical signals. The term copper refers to copper or any conductive material capable of conducting an electronic signal. The input is any interface capable of receiving one or more electronic signals from a path or paths consisting of copper or other conductive material. The converting component is any combination of hardware or hardware and software capable of converting the one or more electronic signals to one or more optical signals. The output is any interface capable of coupling to one or more optic fibers and sending one or more optical signals thereon. Each C/F converter also includes an input for power necessary for operation. In some embodiments, C/F converters are Versitron FOM II Series Model F270X/271X. In some embodiments, C/F converters are Lanode Model FRM220. C/F converters are known in the art and are not described in further detail in the present disclosure.

First F/C converter 156 and second C/F converter 158 are each a device that includes an input configured to receive one or more optical signals, a converting component configured to convert the one or more optical signals to one or more electronic signals, and an output configured to send the one or more electronic signals. The input is any interface capable of coupling to and receiving one or more an optical signals from one or more optic fibers. The converting component is any combination of hardware or hardware and software capable of converting the one or more optical signals to one or more electronic signals. The output is any interface capable of sending an optical signal to one or more paths consisting of copper or other conductive material. Each F/C converter also includes an input for power necessary for operation. In some embodiments, F/C converters are Versitron FOM II Series Model F270X/271X. In some embodiments, F/C converters are Lanode Model FRM220. F/C converters are known in the art and are not described in further detail in the present disclosure.

Power controls 124, 126, 128, 160, 162, and 164 are each a device that includes an input configured to receive one or more control signals and a control component capable of shutting off or delivering power to an external device in response to the one or more control signals. The control component can be any combination of hardware or hardware and software capable of causing a change in power delivery in response to the one or more control signals. In some embodiments, the control component includes a control gate. In some embodiments, the control gate is an AND control gate. In some embodiments, the control component includes at least one shutoff relay. A shutoff relay is any mechanical or solid state switch. In some embodiments, the control component includes at least one Class 1 shutoff relay. In at least some embodiments, the power control is integrated as a part of the controlled device, e.g., C/F converter or F/C converter.

First I/O rack 130 and second I/O rack 166 are each one or more input/output devices configured to receive one or more functional signals from first computing device 112 and/or second computing device 114. First I/O rack 130 and second I/O rack 166 are further configured to respond to the one or more functional signals by performing any type of input/output function. I/O racks are known in the art and are not described in further detail in the present disclosure.

On master unit 110, each of first computing device 112 and second computing device 114 is configured to output a life signal. A life signal is any signal capable of being transmitted electronically and is any combination of periodic and non-periodic signal components.

In some embodiments, life signals are heartbeat-type signals including any type of periodic waveform including, but not limited to, a sine wave, a square wave, or a triangular wave. In some embodiments, life signals include preconfigured variations to signal characteristics including, but not limited to, frequency, period, and amplitude. In various embodiments, preconfigured variations to signal characteristics occur at regular intervals, irregular intervals, or continuously. In some embodiments the regular intervals range from fractions of seconds to tens of hours.

Referring to FIG. 1, a first life signal produced and sent by first computing device 112 is routed to the inputs of first VSC 116 and first C/F converter 120. A second life signal produced and sent by second computing device 114 is routed to the inputs of second VSC 118 and second C/F converter 122.

First C/F converter 120, fiber 180, and first F/C converter 156 form a path for forwarding the first life signal to the input of third VSC 152 on slave unit 150. Second C/F converter 122, fiber 180, and second F/C converter 158 form a path for forwarding the second life signal to the input of fourth VSC 154 on slave unit 150.

Referring to FIG. 1, on master unit 110, first VSC 116 control signal output is routed to second power control 126. Second power control 126 is configured to control power delivery to second C/F converter 122. Similarly, second VSC 118 control signal output is routed to first power control 124. First power control 124 is configured to control power delivery to first C/F converter 120.

In use, first VSC 116 responds to a failure to detect a life signal at the first VSC input by outputting a power down indication. As configured, second power control 126 receives the power down indication output by first VSC 116 and, in response, causes second C/F converter 122 to be powered down.

Similarly, in use, second VSC 118 responds to a failure to detect a life signal at the second VSC input by outputting a power down indication. As configured, first power control 124 receives the power down indication output by second VSC 118 and, in response, causes first C/F converter 120 to be powered down.

Referring to FIG. 1, on slave unit 150, third VSC 152 control signal output is routed to fifth power control 162. Fifth power control 162 is configured to control power delivery to second F/C converter 158. Similarly, fourth VSC 154 control signal output is routed to fourth power control 160. Fourth power control 160 is configured to control power delivery to first F/C converter 156.

In use, third VSC 152 responds to a failure to detect a life signal at the third VSC input by outputting a power down indication. As configured, fifth power control 162 receives the power down indication output by third VSC 152 and, in response, causes second F/C converter 158 to be powered down.

Similarly, in use, fourth VSC 154 responds to a failure to detect a life signal at the fourth VSC input by outputting a power down indication. As configured, fourth power control 160 receives the power down indication output by fourth VSC 154 and, in response, causes first F/C converter 156 to be powered down.

This cross-connection configuration provides the capability for safety critical shutdown of the slave unit. As described below, in use, a failure of either slave unit VSC triggers a shutdown of both slave VSCs and both F/C converters.

In use, because third VSC 152 controls second F/C converter 158, which is part of the path for forwarding the second life signal to the fourth VSC input, powering down second F/C converter 158 triggers a failure of fourth VSC 154 to detect the second life signal. This failure in turn causes first F/C converter 156 to be powered down, breaking the path for forwarding the first life signal to the third VSC input.

Similarly, in use, because fourth VSC 154 controls first F/C converter 156, which is part of the path for forwarding the first life signal to the third VSC input, powering down first F/C converter 156 triggers a failure of third VSC 152 to detect the first life signal. This failure in turn causes second F/C converter 158 to be powered down, breaking the path for forwarding the second life signal to the fourth VSC input.

In some embodiments, as depicted in FIG. 1, master unit 110 includes third power control 128 and first I/O rack 130. First VSC 116 control signal output and second VSC 118 control signal output are routed to third power control 128. Third power control 128 is configured to control power delivery to first I/O rack 130. In some embodiments, first VSC 116 control signal output and second VSC 118 control signal output are routed to a control gate on third power control 128. In some embodiments, the control gate is an AND control gate.

In use, first VSC 116 responds to a failure to detect a life signal at the first VSC input by outputting a power down indication. As configured in some embodiments, third power control 128 receives the power down indication output by first VSC 116 and, in response, causes first I/O rack 130 to be powered down. Similarly, in use, second VSC 118 responds to a failure to detect a life signal at the second VSC input by outputting a power down indication. As configured in some embodiments, third power control 128 receives the power down indication output by second VSC 118 and, in response, causes first I/O rack 130 to be powered down.

In some embodiments, first I/O rack 130 is instead a different component comprising any combination of hardware and software. In such embodiments, in use, third power control 128 acts to disable this component by powering the component down.

In some embodiments, as depicted in FIG. 1, slave unit 150 includes sixth power control 164 and second I/O rack 166. Third VSC 152 control signal output and fourth VSC 154 control signal output are routed to sixth power control 164. Sixth power control 164 is configured to control power delivery to second I/O rack 166. In some embodiments, third VSC 152 control signal output and fourth VSC 154 control signal output are routed to a control gate on sixth power control 164. In some embodiments, the control gate is an AND control gate.

In use, third VSC 152 responds to a failure to detect a life signal at the third VSC input by outputting a power down indication. As configured in some embodiments, sixth power control 164 receives the power down indication output by third VSC 152 and, in response, causes second I/O rack 166 to be powered down. Similarly, in use, fourth VSC 154 responds to a failure to detect a life signal at fourth VSC input by outputting a power down indication. As configured in some embodiments, sixth power control 164 receives the power down indication output by fourth VSC 154 and, in response, causes second I/O rack 166 to be powered down.

As described previously, first VSC 116 responds to a failure to detect a life signal at the first VSC input by causing second C/F converter 122 to be powered down, thereby preventing the second life signal sent by second computing device 114 from being received by fourth VSC 154. In response, fourth VSC 154 causes second I/O rack 166 to be powered down.

Similarly, second VSC 118 responds to a failure to detect a life signal at the second VSC input by causing first C/F converter 120 to be powered down, thereby preventing the first life signal sent by first computing device 112 from being received by third VSC 152. In response, third VSC 152 causes second I/O rack 166 to be powered down.

In use, then, for those embodiments that include sixth power control 164 and second I/O rack 166, failure of any VSC to detect a life signal at the particular VSC input causes second I/O rack 166 to be powered down. In other embodiments, second I/O rack 166 is instead a different component comprising any combination of hardware and software. In such embodiments, failure of any VSC to detect a life signal at the particular VSC input causes this component to be disabled by being powered down.

In some embodiments, system 100 includes additional components configured to provide a functional signal path from master unit 110 to slave unit 150. In the embodiment depicted in FIG. 1, first computing device 112 and/or second computing device 114 are/is configured to send one or more functional signals to one or more additional C/F converters 132. Fiber 180 provides at least one path from additional C/F converters 132 to one or more additional F/C converters 168 on slave unit 150. Second I/O rack 166 on slave unit 150 is configured to receive the one or more functional signals from additional F/C converters 168.

Figure 2:
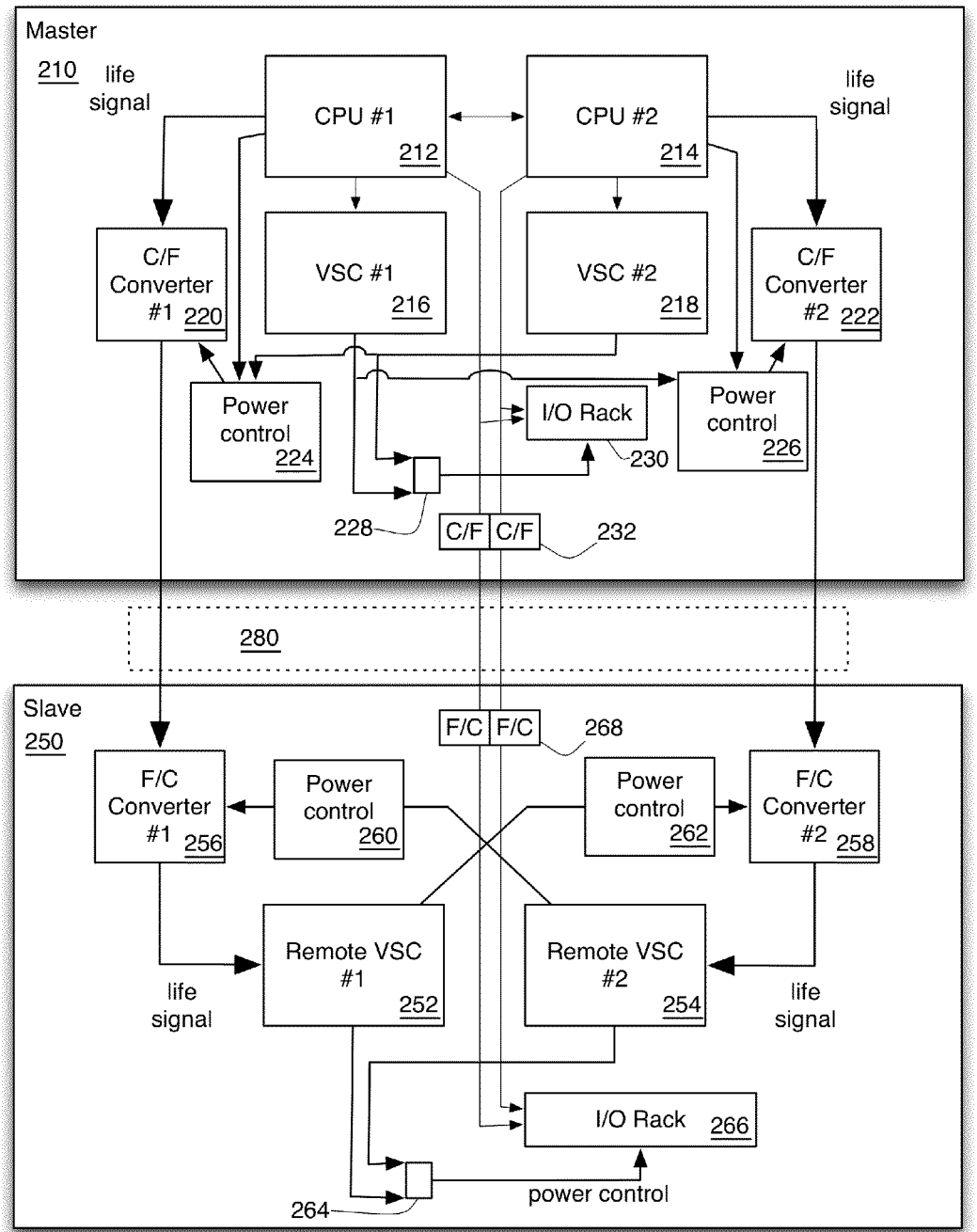
FIG. 2 is a schematic drawing illustrating a system for remote vital shutdown of a slave unit, in some embodiments, showing a master unit with enhanced control linked by an optic fiber connection to a slave unit.

In an embodiment depicted in FIG. 2, system 200 includes master unit 210 and slave unit 250. Master unit 210 includes first computing device 212, second computing device 214, first VSC 216, second VSC 218, first C/F converter 220, second C/F converter 222, first power control 224, second power control 226, third power control 228, first I/O rack 230, and additional C/F converters 232. Slave unit 250 includes third VSC 252, third VSC 254, first F/C converter 256, second F/C converter 258, fourth power control 260, fifth power control 262, sixth power control 264, I/O rack 266, and additional F/C converters 268. Components numbered similarly to those in FIG. 1 are substantially similar to the corresponding components in FIG. 1 as described in preceding paragraphs.

As depicted in FIG. 2, e.g., first computing device 212 is further configured to output a power control signal capable of having a state corresponding to a power down indication. First power control 224 is configured to receive the power control signal output by first computing device 212. Similarly, second computing device 214 is further configured to output a power control signal capable of having a state corresponding to a power down indication. Second power control 226 is configured to receive the power control signal output by second computing device 214.

In such embodiments, each of first power control 224 and second power control 226 includes a control gate. In some embodiments, the control gate is an AND control gate.

In use, first VSC 216 responds to a failure to detect a life signal at its input by outputting a power down indication. As configured, second power control 226 receives the power down indication output by first VSC 216 and, in response, causes second C/F converter 222 to be powered down. In this respect, the embodiment depicted in FIG. 2 is similar to the embodiment depicted in FIG. 1. As further configured, second power control 226 receives a power down indication from second computing device 214 and, in response, causes second C/F converter 222 to be powered down.

Similarly, in use, second VSC 218 responds to a failure to detect a life signal at its input by outputting a power down indication. As configured, first power control 224 receives the power down indication output by second VSC 218 and, in response, causes first C/F converter 220 to be powered down. In this respect, the embodiment depicted in FIG. 2 is similar to the embodiment depicted in FIG. 1. As further configured, first power control 224 receives a power down indication from first computing device 212 and, in response, causes first C/F converter 220 to be powered down.

The embodiment depicted in FIG. 2 is similar to the embodiment depicted in FIG. 1 in that, in use, failure of any VSC to detect a life signal at its input causes second I/O rack 266 to be powered down, and failure of any master unit VSC causes both first I/O rack 230 and second I/O rack 266 to be powered down. Again, other embodiments are contemplated in which first I/O rack 230 and second I/O rack 266 are instead different components comprising any combination of hardware and software. In such embodiments, these components are disabled by being powered down by third power control 228 and sixth power control 264, respectively.

In the embodiment depicted in FIG. 2, e.g., first computing device 212 has the additional capability of, in use, powering down first C/F converter 220 while valid life signals are detected at the inputs of first VSC 216 and second VSC 218. Similarly, second computing device 214 has the capability of, in use, powering down second C/F converter 222 while valid life signals are detected at the inputs of first VSC 216 and second VSC 218. As seen above with respect the embodiment depicted in FIG. 1, powering down of either first C/F converter 220 or second C/F converter 222 causes second I/O rack 266 to be powered down.

In this configuration, then, power to first I/O rack 230 is capable of being maintained while first computing device 212 and second computing device 214 exercise independent control over second I/O rack 266. In use, power is maintained to first I/O rack 230 while second I/O rack 266 is either powered on or powered down.

The present description also concerns a method of remotely shutting down a slave unit. An example embodiment of a method of remotely shutting down a slave unit is depicted in FIG. 3. Various embodiments include some or all of the steps depicted in FIG. 3.

In step 302, on a master unit, a first computing device sends a first life signal to a first VSC and a first C/F converter, and a second computing device sends a second life signal to a second VSC and a second C/F converter.

In step 304, on a fiber coupled between the master unit and a slave unit, the first life signal is forwarded from the first C/F converter on the master unit to a first F/C converter on the slave unit, and the second life signal is forwarded from the second C/F converter on the master unit to a second F/C converter on the slave unit.

In step 306, on the slave unit, the first F/C converter forwards the first life signal to a third VSC, and the second F/C converter forwards the second life signal to a fourth VSC.

In step 308, the second VSC monitors the second life signal at its input and, in response to failing to verify the second life signal, powers down the first C/F converter.

In step 310, the first VSC monitors the first life signal at its input and, in response to failing to verify the first life signal, powers down the second C/F converter.

In step 312, the fourth VSC monitors the second life signal at its input and, in response to failing to verify the second life signal, powers down the first F/C converter.

In step 314, the fifth VSC monitors the first life signal at its input and, in response to failing to verify the first life signal, powers down the second F/C converter.

In step 316, in some embodiments, the first VSC or the second VSC, in response to failing to verify the respective life signal at its input, powers down a first I/O rack on the master unit.

In step 318, in some embodiments, the third VSC or the fourth VSC, in response to failing to verify the first life signal or second life signal, respectively, at its input, powers down a second I/O rack on the slave unit.

In step 320, in some embodiments, the first computing device sends a control signal that causes the first C/F converter to be powered down.

In step 322, in some embodiments, the second computing device sends a control signal that causes the second C/F converter to be powered down.

Life signals are subject to corruption due to malfunction of a computing device or forwarding path element, or because of interference from external sources. Confirming expected responses to a corrupted life signal helps to ensure vital or safety critical shutdown, and to achieve an SIL 4 safety level. Component failures are thereby detected before safety is affected.

In some embodiments, a method for shutting down a slave unit includes testing at least one VSC, C/F converter, and/or F/C converter to confirm expected shutdown in response to modifying a life signal. In some embodiments, testing is achieved by applying a test algorithm including modification of at least one life signal.

Figure 4:
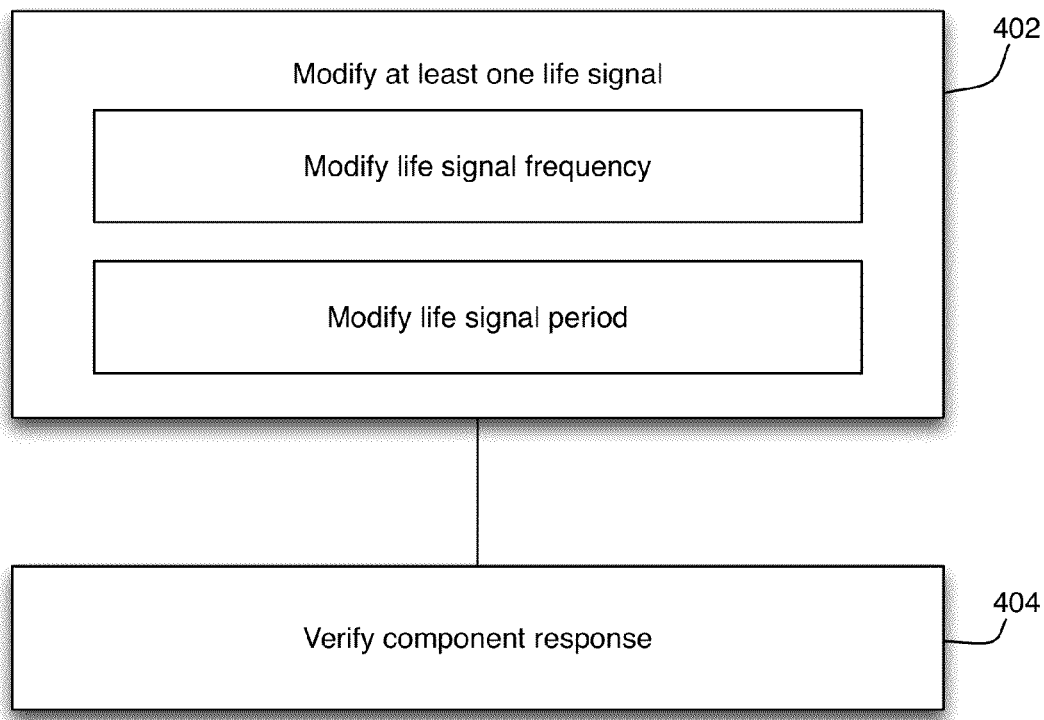
FIG. 4 is a flow chart for applying a test algorithm including modification of at least one life signal.

An example embodiment of applying a test algorithm including modification of at least one life signal is depicted in FIG. 4. Various embodiments include some or all of the steps depicted in FIG. 4.

In step 402, at least one life signal generated by first computing device 112 or second computing device 114 is modified. In some embodiments, modification of the life signal includes at least one preconfigured variation to a signal characteristic including, but not limited to, frequency, period, and amplitude. In various embodiments, one or more preconfigured variations to signal characteristics occur at regular intervals, irregular intervals, or continuously. In some embodiments the regular intervals range from fractions of seconds to tens of hours.

In step 404, the response of at least one component to the modified life signal is verified. In some embodiments, the component is at least one of a VSC, a C/F converter, and/or an F/C converter. In some embodiments, verification of a response is detected directly by a computing device. In some embodiments, verification of a response is detected indirectly by a computing device. In some embodiments, verification of a response includes confirming that a VSC is outputting a power down control signal.

Figure 5:
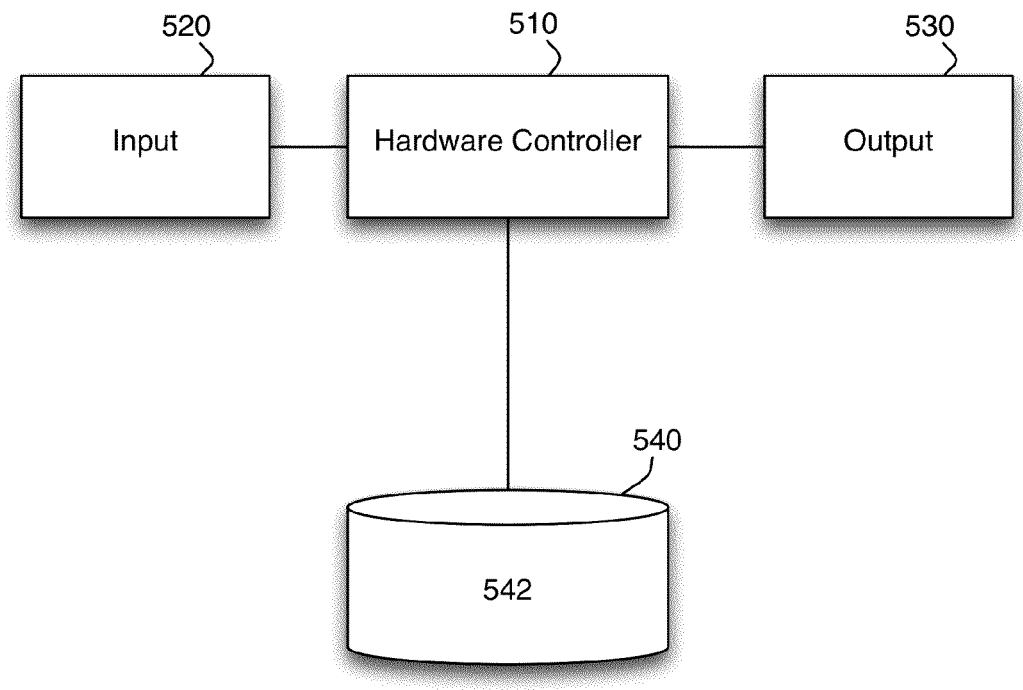
FIG. 5 is a functional block diagram of a vital supervision card usable for implementing the methods disclosed in FIG. 3 and FIG. 4 in accordance with one or more embodiments.

FIG. 5 is a functional block diagram of a VSC 500 usable for implementing the systems disclosed in FIGS. 1 and 2 and the methods disclosed in FIG. 3 and FIG. 4 in accordance with one or more embodiments.

VSC 500 includes a hardware controller 510, input 520, output 530, and, in some embodiments, a non-transitory, computer readable storage medium 540 encoded with, i.e., storing, computer program code 542, i.e., a set of executable instructions. The controller 510 is electrically coupled to the input 520, output 530, and, in some embodiments, computer readable storage medium 540.

In some embodiments, the controller 510 is configured to be usable for determining if one or more signals received by input 520 satisfy predetermined criteria and outputting one or more control signals on output 530 in accordance with the determination as described with reference to FIG. 1 and FIG. 2 and as depicted in FIG. 3.

In some embodiments, the controller 510 is configured to execute the computer program code 542 encoded in the computer readable storage medium 540 in order to cause the VSC 500 to be usable for determining if one or more signals received by input 520 satisfy predetermined criteria and outputting one or more control signals on output 530 in accordance with the determination as described with reference to FIG. 1 and FIG. 2 and as depicted in FIG. 3.

In some embodiments, the controller 510 is a central processing unit (CPU), a multi-processor, a distributed processing system, an application specific integrated circuit (ASIC), complex programmable logic device (CPLD), and/or a suitable processing unit.

In some embodiments, the computer readable storage medium 540 is an electronic, magnetic, optical, electromagnetic, infrared, and/or a semiconductor system (or apparatus or device). For example, the computer readable storage medium 540 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 540 includes a compact disk-read only memory (CD-ROM), a compact disk-read/write (CD-R/W), and/or a digital video disc (DVD).

In some embodiments, the storage medium 540 stores the computer program code 542 configured to cause the VSC 500 to perform a method as depicted in FIG. 3. In some embodiments, the storage medium 540 also stores information needed for performing method 300 and/or method 400 such as the criteria used for verifying a correct life signal.

Although the embodiments and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for remote shutdown of a slave unit, the system comprising:
a master unit comprising a first computing device, a second computing device, a first vital supervision card (VSC), a second VSC, a first copper to fiber (C/F) converter, and a second C/F converter, wherein the first computing device is configured to send a first life signal to the first VSC and the first C/F converter, and the second computing device is configured to send a second life signal to the second VSC and the second C/F converter;
a slave unit comprising a third VSC, a fourth VSC, a first fiber to copper (F/C) converter, and a second F/C converter, wherein the first F/C converter is configured to forward the first life signal to the third VSC, and the second F/C converter is configured to forward the second life signal to the fourth VSC; and
at least one fiber coupled between the master unit and the slave unit, configured to forward the first life signal from the first C/F converter to the first F/C converter and the second life signal from the second C/F converter to the second F/C converter,
wherein:
the first C/F converter is configured to be powered down in response to the second VSC failing to verify the second life signal;
the second C/F converter is configured to be powered down in response to the first VSC failing to verify the first life signal;
the first F/C converter is configured to be powered down in response to the fourth VSC failing to verify the second life signal; and
the second F/C converter is configured to be powered down in response to the third VSC failing to verify the first life signal.

2. The system of claim 1, wherein at least one of the first C/F converter, the second C/F converter, the first F/C converter, and the second F/C converter is configured to be powered down by a shutoff relay.

3. The system of claim 1, wherein at least one of the master unit and the slave unit further comprises an I/O rack, wherein the I/O rack is configured to be powered down in response to either unit VSC failing to verify an associated life signal.

4. The system of claim 1, wherein at least one of the first life signal and the second life signal comprises a test algorithm.

5. The system of claim 4, wherein the test algorithm comprises temporary modification of at least one of a life signal period and a life signal frequency.

6. The system of claim 1, wherein at least one of the first C/F converter and the second C/F converter is configured to be powered down in response to a control signal from its respective computing device.

7. The system of claim 6, wherein at least one of the first C/F converter and the second C/F converter is further configured to be powered down in response to an output of an AND control gate.

8. A master unit comprising a first computing device, a second computing device, a first vital supervision card (VSC), a second VSC, a first copper to fiber (C/F) converter, and a second C/F converter, wherein:
the first computing device is configured to send a first life signal to the first VSC and the first C/F converter;
the second computing device is configured to send a second life signal to the second VSC and the second C/F converter;

the first C/F converter is configured to be powered down in response to the second VSC failing to verify the second life signal; and the second C/F converter is configured to be powered down in response to the first VSC failing to verify the first life signal.

9. The master unit of claim 8, wherein at least one of the first C/F converter and the second C/F converter is configured to be powered down in response to a control signal from its respective computing device.

10. The master unit of claim 8, further comprising an I/O rack, wherein the I/O rack is configured to be powered down in response to at least one of the first VSC or the second VSC failing to verify an associated life signal.

11. A slave unit comprising a first VSC, a second VSC, a first fiber to copper (F/C) converter, and a second F/C converter, wherein:

the first F/C converter is configured to forward a first life signal to the first VSC;

the second F/C converter is configured to forward a second life signal to the second VSC;

the first F/C converter is configured to be powered down in response to the second VSC failing to verify the second life signal; and the second F/C converter is configured to be powered down in response to the first VSC failing to verify the first life signal.

12. The slave unit of claim 11, further comprising an I/O rack, wherein the I/O rack is configured to be powered down in response to at least one of the first VSC or the second VSC failing to verify an associated life signal.

13. A method of remotely shutting down a slave unit, the method comprising:

sending, on a master unit, a first life signal from a first computing device to a first vital supervision card (VSC) and a first copper to fiber (C/F) converter, and a second life signal from a second computing device to a second VSC and a second C/F converter;

forwarding, on at least one fiber coupled between the master unit and a slave unit, the first life signal from the first C/F converter to a first fiber to copper (F/C) converter on the slave unit, and the second life signal from the second C/F converter to a second F/C converter on the slave unit;

forwarding, on the slave unit, the first life signal from the first F/C converter to a third VSC, and the second life signal from the second F/C converter to a fourth VSC;

powering down the first C/F converter in response to the second VSC failing to verify the second life signal;

powering down the second C/F converter in response to the first VSC failing to verify the first life signal;

powering down the first F/C converter in response to the fourth VSC failing to verify the second life signal; and powering down the second F/C converter in response to the third VSC failing to verify the first life signal.

14. The method of claim 13, wherein powering down at least one of the first C/F converter, the second C/F converter, the first F/C converter, and the second F/C converter is achieved by a shutoff relay.

15. The method of claim 13, further comprising powering down at least one of a master unit I/O rack and a slave unit I/O rack in response to either unit VSC failing to verify an associated life signal.

16. The method of claim 13, further comprising applying a test algorithm comprising modification of at least one life signal.

17. The method of claim 16, wherein the test algorithm further comprises verifying at least one VSC outputting a power down control signal in response to a life signal modification.

18. The method of claim 16, wherein the modification of at least one life signal comprises temporary modification of at least one of a life signal period or a life signal frequency.

19. The method of claim 13, further comprising at least one of powering down the first C/F converter in response to a control signal from the first computing device and powering down the second C/F converter in response to a control signal from the second computing device.

20. The method of claim 19, further comprising simultaneously maintaining power to an I/O rack on the master unit.

* * * * *